(12) United States Patent
Wu et al.

(10) Patent No.: US 12,037,488 B1
(45) Date of Patent: Jul. 16, 2024

(54) LIQUID MOLDING COMPOUND AND PREPARATION METHOD THEREOF

(71) Applicant: Hubei Choice Technology Co., Ltd., Ezhou (CN)

(72) Inventors: De Wu, Ezhou (CN); Shengquan Wang, Ezhou (CN); Shuhang Liao, Ezhou (CN); Junxing Su, Ezhou (CN)

(73) Assignee: Hubei Choice Technology Co., Ltd., Ezhou (CN)

( * ) Notice: Subject to any disclaimer, the term of this patent is extended or adjusted under 35 U.S.C. 154(b) by 0 days.

(21) Appl. No.: 18/639,612

(22) Filed: Apr. 18, 2024

Related U.S. Application Data

(63) Continuation of application No. PCT/CN2023/092801, filed on May 8, 2023.

Foreign Application Priority Data

Apr. 26, 2023 (CN) .......................... 202310462277.5

(51) Int. Cl.
  *C08K 3/04* (2006.01)
  *C08K 3/36* (2006.01)
  *C08L 63/00* (2006.01)

(52) U.S. Cl.
  CPC ............... *C08L 63/00* (2013.01); *C08K 3/04* (2013.01); *C08K 3/36* (2013.01); *C08K 2201/014* (2013.01); *C08L 2207/322* (2013.01)

(58) Field of Classification Search
  CPC ...... C08K 3/04; C08K 3/36; C08K 2201/014; C08L 2207/322; C08L 63/00
  USPC ......................................................... 524/600
  See application file for complete search history.

(56) References Cited

U.S. PATENT DOCUMENTS 5,739,184 A     4/1998  Marbry et al.

FOREIGN PATENT DOCUMENTS

| CN | 113249066 A |   | 8/2021 |
| CN | 115772374 A | * | 3/2023 |
| CN | 115772374 A |   | 3/2023 |

* cited by examiner

*Primary Examiner* — Kelechi C Egwim
(74) *Attorney, Agent, or Firm* — George D. Morgan

(57) ABSTRACT

The disclosure provides a liquid molding compound and preparation method thereof, belonging to the technical field of semiconductor packaging. The liquid molding compound includes: the following components in mass fraction, a filler 83%-88%, an epoxy resin 6%-9%, a curing agent 6%-9%, a colorant 0.1%-0.2%, an accelerator 0.1%-0.3%, and a paraffin oil 0.3%-0.6%; by adding paraffin oil that has a small surface activity, paraffin oil does not participate in the reaction between epoxy resin and curing agent, is easily compatible with epoxy resin, and easy to precipitate under heating conditions. The precipitated paraffin oil forms a spacer layer between the colloid surface and the thermal release tape. The paraffin oil of the spacer layer has almost no adhesion to the acrylic adhesive on the thermal release tape, so the thermal release tape can be easily removed at a certain temperature to achieve the effect of no residual adhesive.

10 Claims, 1 Drawing Sheet

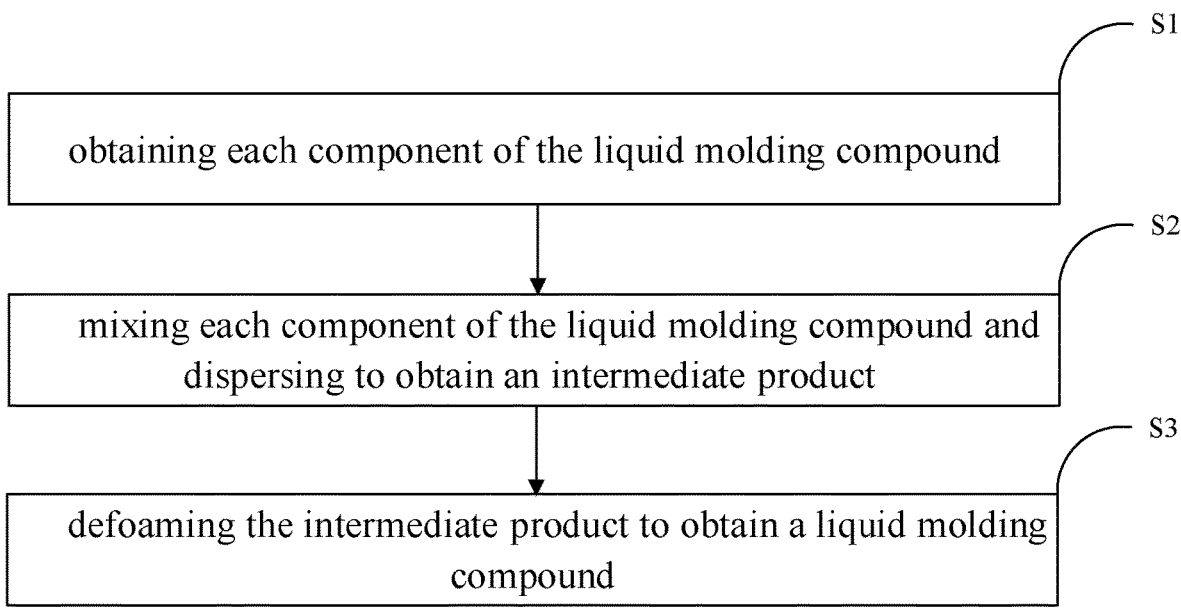

LIQUID MOLDING COMPOUND AND PREPARATION METHOD THEREOF

CROSS-REFERENCE TO RELATED APPLICATIONS

The disclosure claims priority to Chinese Patent Application No. 2023104622775, filed on Apr. 26, 2023, and titled "LIQUID MOLDING COMPOUND AND PREPARATION METHOD THEREOF", the entire contents of which are incorporated herein by reference.

TECHNICAL FIELD

The disclosure relates to the technical field of semiconductor packaging, and in particular to a liquid molding compound and preparation method thereof.

BACKGROUND

In recent years, in response to demands for miniaturization, thinness, and multi-functionality of IT equipment represented by mobile phones, the necessity of higher-density mounting technology in semiconductor devices (semiconductor packaging) has increased.

Fan-out wafer-level packaging (FO WLP) is a key driving force in the industry's transformation from transistor scaling to system scaling and integration. The process of fan-out wafer-level packaging is as follows: first, attaching thermal release tape to the carrier wafer, then picking up the KGD (known good die) and placing it on the carrier; next, molding, followed by substrate detachment, RDL rewiring bump production, and finally cutting package. However, currently, adhesive residue is prone to occur on the carrier wafer during the release process of the thermal release tape.

SUMMARY

By utilizing one or more embodiments of the disclosure, the technical problem in the prior art that adhesive residue is prone to occur during the release process of the thermal release tape is solved.

In a first aspect of the disclosure, a liquid molding compound is provided, including: the following components in mass fraction, a filler 83%-88%, an epoxy resin 6%-9%, a curing agent 6%-9%, a colorant 0.1%-0.2%, an accelerator 0.1%-0.3%, and a paraffin oil 0.3%-0.6%.

In a second aspect of the disclosure, a preparation method of the liquid molding compound described in the first aspect is provided, including: obtaining each component of the liquid molding compound; mixing each component of the liquid molding compound and dispersing to obtain an intermediate product; and defoaming the intermediate product to obtain a liquid molding compound.

BRIEF DESCRIPTION OF DRAWINGS

In order to more clearly illustrate the technical solutions in the embodiments of the disclosure, a brief introduction will be made below to the drawings that need to be used in the description of the embodiments. It will be apparent that the drawings described below are some of the embodiments of the disclosure, and other drawings may be obtained from these drawings without any creative effort by those of ordinary skill in the art.

The FIGURE shows a flow chart of a preparation method of the liquid molding compound according to some embodiments of the disclosure.

DETAILED DESCRIPTION OF THE EMBODIMENTS

In order to make the objective, technical solutions and advantages of the embodiments of the disclosure clearer, the technical solutions in the disclosure will be clearly and completely described below in conjunction with the drawings in the embodiments of the disclosure. It will be apparent that the described embodiments are part of and not all of the embodiments of the disclosure. Based on the embodiments in the disclosure all other embodiments obtained without creative effort by those of ordinary skill in the art fall within the scope of protection of the disclosure.

Various embodiments of the disclosure may exist in the form of a range; it should be understood that the description in the form of a range is only for convenience and simplicity and should not be understood as a rigid limit to the scope of the disclosure; therefore, it should be considered that the range descriptions have specifically disclosed all possible sub-ranges as well as the single numerical values within such ranges. For example, a description of a range from 1 to 6 should be considered to have specifically disclosed sub-ranges, such as from 1 to 3, from 1 to 4, from 1 to 5, from 2 to 4, from 2 to 6, from 3 to 6, etc., and a single number within the stated range, such as 1, 2, 3, 4, 5, and 6, which is applicable regardless of the range. Additionally, whenever a numerical range is indicated in this disclosure, it is intended to include any cited number (fractional or integer) within the indicated range. Unless otherwise specified, various raw materials, reagents, instruments and equipment used in the disclosure can be purchased in the market or prepared by existing methods.

In the disclosure, unless otherwise specified, the directional words used such as "upper" and "lower" are specifically the direction of the drawing in the drawings. In addition, in the description of the disclosure, the terms "including", "comprising" and the like mean "including but not limited to". In this disclosure, relational terms such as "first" and "second" are merely used to distinguish one entity or operation from another entity or operation and do not necessarily require or imply that any such actual relationship or sequence exists between them. In this disclosure, "and/or" describes the association of associated objects, indicating that there can be three relationships, for example, A and/or B, which can mean: A exists alone, A and B exist simultaneously, and B exists alone. Wherein A and B can be singular or plural. In this disclosure, "at least one" means one or more, and "plurality" means two or more. "At least one", "at least one of the following" or similar expressions refer to any combination of these items, including any combination of single item (items) or plural items. For example, "at least one of a, b, or c", or "at least one of a, b, and c" can mean: a, b, c, a-b (that is, a and b), a-c, b-c, or a-b-c, wherein a, b, and c can be single or multiple respectively.

In a first aspect, the disclosure provides a liquid molding compound, including: the following components in mass fraction, a filler 83%-88%, an epoxy resin 6%-9%, a curing agent 6%-9%, a colorant 0.1%-0.2%, an accelerator 0.1%-0.3%, and a paraffin oil 0.3%-0.6%.

Each of the above compositions can be obtained by preparation or the mode of commercial purchase, and the effect of each component is as follows: a filler can be selected from silica that acts as inorganic filler, reduces material expansion coefficient, and increases material strength; an epoxy resin is used as a material matrix, naphthalene-type epoxy resin itself has greater rigidity and has a larger storage modulus than other epoxy resins after curing. Epoxy resins include polycyclic aromatic epoxy resin, and specifically, cycloaromatic epoxy resin can be selected from at least one of dihydroanthracene epoxy resin and HP6000 (Nippon Kayaku); a curing agent reacts with the epoxy resin under a certain temperature and the action of an accelerator, and the system changes from a fluid state to a solid state; the curing agent includes an anhydride curing agent, specifically, the anhydride curing agent can be selected from at least one of methyl endomethylene tetra-hydrophthalic anhydride (methyl-5-norbornene-2,3-dicar-boxylic anhydride) and 3,4,5,6-tetrahydrophthalic anhy-dride; a colorant mainly plays the role of dyeing, and the colorant can be selected from carbon black; an accelerator is equivalent to a catalyst, does not work at room temperature, and can promote the reaction at a certain temperature. The accelerator includes amine accelerators, the amine accelera-tor can be selected from at least one of DBU

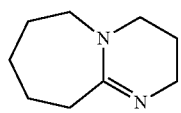

and pyridine

and the paraffin oil does not participate in the reaction of other components and has a certain dilution effect. At the same time, it can be well dispersed in the system and easily precipitates on the colloid surface at a certain temperature to form a barrier layer and achieve release without adhesive residue.

In some embodiments, the liquid molding compound includes: the following components in mass fraction, a filler 84%-87%, an epoxy resin 7%-8%, a curing agent 7%-8%, a colorant 0.12%-0.18%, an accelerator 0.15%-0.25%, and a paraffin oil 0.4%-0.5%.

In some embodiments, the liquid molding compound includes: the following components in mass fraction, a filler 85%-86%, an epoxy resin 7.3%-7.7%, a curing agent 7.3%-7.7%, a colorant 0.14%-0.16%, an accelerator 0.18%-0.22%, and a paraffin oil 0.43%-0.47%.

As shown in the FIGURE, in a second aspect, the disclo-sure provides a preparation method of the liquid molding compound described in the first aspect, the method includes: S1, obtaining each component of the liquid molding com-pound; S2, mixing each component of the liquid molding compound and dispersing to obtain an intermediate product; and S3, defoaming the intermediate product to obtain a liquid molding compound.

In S1, the liquid molding compound includes: the follow-ing components in mass fraction, a filler 83%-88%, an epoxy resin 6%-9%, a curing agent 6%-9%, a colorant 0.1%-0.2%, an accelerator 0.1%-0.3%, and a paraffin oil 0.3%-0.6%. In S2, each component of the liquid molding compound is added into a mixing cup, and a centrifugal mixer is applied to stir for an appropriate time until the system is initially mixed evenly; the initially mixed mate-rials are added into a three-roller drum for dispersion processing to obtain a uniformly dispersed intermediate product; wherein, the stirring time is 100-150 s, the rotation is 900 r/min, and the revolution is 1300 r/min; the feeding gap of the three-roller is 100-200 um, and the discharging gap is 200-400 um. In S3, a centrifugal mixer is used to vacuum-degas the uniformly dispersed intermediate product to obtain a liquid molding compound; the vacuum degassing time of the centrifugal mixer is 60-100 s, the rotation is 100 r/min, and the revolution is 1200 r/min.

The disclosure will be further elaborated below in con-junction with specific embodiments. It should be understood that these embodiments are only used to illustrate the disclosure and are not intended to limit the scope of the disclosure. Experimental methods without specifying spe-cific conditions in the following embodiments are usually measured in accordance with national standards. If there is no corresponding national standard, general international standards, conventional conditions, or conditions recom-mended by the manufacturer shall be followed.

Embodiment 1: a liquid molding compound, including in mass fraction: a silica 85.3%, a dihydroanthracene epoxy resin 7%, a methyl-5-norbornene-2,3-dicarboxylic anhy-dride 7%, a carbon black 0.1%, a DBU 0.2%, and a paraffin oil 0.4%.

Embodiment 2: a liquid molding compound, including in mass fraction: a silica 85.1%, a dihydroanthracene epoxy resin 7%, a methyl-5-norbornene-2,3-dicarboxylic anhy-dride 7%, a carbon black 0.1%, a DBU 0.2%, and a paraffin oil 0.6%.

Embodiment 3: a liquid molding compound, including in mass fraction: a silicon dioxide 85.4%, a dihydroanthracene epoxy resin 7%, a methyl-5-norbornene-2,3-dicarboxylic anhydride 7%, a carbon black 0.1%, a DBU 0.2%, and a paraffin oil 0.3%.

Comparative Example 1: a liquid molding compound, including in mass fraction: a silicon dioxide 85.7%, a dihydroanthracene epoxy resin 7%, a methyl-5-norbornene-2,3-dicarboxylic anhydride 7%, a carbon black 0.1%, and a DBU 0.2%.

Comparative Example 2: a liquid molding compound, including in mass fraction: a silicon dioxide 85.6%, a dihydroanthracene epoxy resin 7%, a methyl-5-norbornene-2,3-dicarboxylic anhydride 7%, a carbon black 0.1%, a DBU 0.2%, and a paraffin oil 0.1%.

Comparative Example 3: a liquid molding compound, including in mass fraction: a silicon dioxide 85%, a dihy-droanthracene epoxy resin 7%, a methyl-5-norbornene-2,3-dicarboxylic anhydride 7%, a carbon black 0.1%, a DBU 0.2%, and a paraffin oil 0.7%.

Comparative Example 4: a liquid molding compound, including in mass fraction: a silicon dioxide 82%, a dihy-droanthracene epoxy resin 12%, a methyl-5-norbornene-2, 3-dicarboxylic anhydride 5%, a carbon black 0.1%, a DBU 0.2%, and a paraffin oil 0.7%.

Comparative Example 5: a liquid molding compound, including in mass fraction: a silicon dioxide 85.3%, a dihydroanthracene epoxy resin 7%, a methyl-5-norbornene-2,3-dicarboxylic anhydride 7%, a carbon black 0.1%, a DBU 0.2%, and a glycerol 0.4%.

The liquid molding compound provided by Embodiments 1 to 3 and Comparative Examples 1 to 5 are applied to carry out semiconductor packaging, and the adhesive residue released by thermal release tape is shown in Table 1.

TABLE 1

| | Adhesive Residue Grade | Notes |
|---|---|---|
| Comparative Example 1 | A | / |
| Comparative Example 2 | C | / |
| Comparative Example 3 | D | The thermal release tape cannot adhere tightly to the colloid before heating. |
| Comparative Example 4 | D | Cannot meet physical property requirements for use |
| Comparative Example 5 | A | / |
| Embodiment 1 | D | / |
| Embodiment 2 | D | / |
| Embodiment 3 | D | / |

In Table 1, Class A indicates that the adhesive residue accounts for 100% of the surface of the wafer, Class B indicates that the adhesive residue accounts for more than 50% of the surface of the wafer, Class C indicates that the adhesive residue accounts for less than 50% of the surface of the wafer, and Class D indicates that there is no residue adhesive at all.

It can be seen from Table 1 that when the liquid molding compound provided by some embodiments of the disclosure is used to package semiconductors, there will be no adhesive residue during the release of the thermal release tape. By comparing Comparative Example 1 with the embodiments, it can be found that when no paraffin oil is added, a more serious adhesive residue will occur, and by comparing Comparative Example 1 and 2 with the embodiments, it can be seen that when a small amount of paraffin oil is added, the adhesive residue will be improved to some extent, but the situation still exists, and the adhesive residue can be better eliminated when the added amount reaches at least 0.2%; by comparing Comparative Example 2 and the embodiments, it can be seen that when the added amount of paraffin oil is greater than 0.6%, although there will be no adhesive residue during the release process, the thermal release tape cannot be well bonded to the colloid before heating; by comparing Comparative Example 4 and the embodiments, it can be seen that when the proportion of each component is not within the scope of this disclosure, the product cannot meet the physical property requirements for use; by comparing Comparative Example 5 and the embodiments, it can be seen that using other substances such as glycerol to replace paraffin oil cannot improve the situation of adhesive residue.

The above-mentioned technical solutions provided by some embodiments of the disclosure have the following advantages compared with the prior art: according to the liquid molding compound, by adding paraffin oil that has small surface activity, the paraffin oil does not participate in the reaction between epoxy resin and curing agent, is easily compatible with epoxy resin, and easy to precipitate under heating conditions; the precipitated paraffin oil forms a spacer layer between the colloid surface and the thermal release tape. The paraffin oil of the spacer layer has almost no adhesion to the acrylic adhesive on the thermal release tape, so the thermal release tape can be easily removed at a certain temperature to achieve the effect of no residual adhesive.

The above are only specific embodiments of the disclosure, so that those skilled in the art can understand or implement the disclosure. Various modifications to these embodiments will be readily apparent to those skilled in the art, and the generic principles defined in the disclosure may be practiced in other embodiments without departing from the spirit or scope of the disclosure. Accordingly, the disclosure will not be limited to the embodiments shown herein but is intended to conform to the widest scope consistent with the principles and novel features claimed herein.

What is claimed is:

1. A liquid molding compound, comprising: the following components in mass fraction, a filler 83%-88%, an epoxy resin 6%-9%, a curing agent 6%-9%, a colorant 0.1%-0.2%, an accelerator 0.1%-0.3%, and a paraffin oil 0.3%-0.6%.

2. The liquid molding compound according to claim 1, wherein the liquid molding compound comprises: the following components in mass fraction, a filler 84%-87%, an epoxy resin 7%-8%, a curing agent 7%-8%, a colorant 0.12%-0.18%, an accelerator 0.15%-0.25%, and a paraffin oil 0.4%-0.5%.

3. The liquid molding compound according to claim 2, wherein the liquid molding compound comprises: the following components in mass fraction, a filler 85%-86%, an epoxy resin 7.3%-7.7%, a curing agent 7.3%-7.7%, a colorant 0.14%-0.16%, an accelerator 0.18%-0.22%, and a paraffin oil 0.43%-0.47%.

4. The liquid molding compound according to claim 1, wherein a viscosity of the paraffin oil is 300 cP-700 cP.

5. The liquid molding compound according to claim 1, wherein the filler comprises silica.

6. The liquid molding compound according to claim 1, wherein the epoxy resin comprises polycyclic aromatic epoxy resin.

7. The liquid molding compound according to claim 6, wherein the polycyclic aromatic epoxy resin comprises at least one of dihydroanthracene epoxy resin and HP6000.

8. The liquid molding compound according to claim 1, wherein the curing agent comprises at least one of methyl endomethylene tetrahydrophthalic anhydride and tetrahydrophthalic anhydride.

9. The liquid molding compound according to claim 1, wherein the accelerator comprises at least one of DBU and pyridine.

10. A preparation method of the liquid molding compound according to claim 1, wherein the method comprises:
obtaining each component of the liquid molding compound;
mixing each component of the liquid molding compound and dispersing to obtain an intermediate product; and
defoaming the intermediate product to obtain a liquid molding compound.

* * * * *